(12) United States Patent
Hunt

(10) Patent No.: US 7,127,514 B2
(45) Date of Patent: Oct. 24, 2006

(54) STATELESS DISTRIBUTED COMPUTER ARCHITECTURE WITH SERVER-ORIENTED STATE-CACHING OBJECTS MAINTAINED ON NETWORK OR CLIENT

(75) Inventor: Galen C. Hunt, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 954 days.

(21) Appl. No.: 09/752,114

(22) Filed: Dec. 28, 2000

(65) Prior Publication Data

US 2002/0087657 A1    Jul. 4, 2002

(51) Int. Cl.
*G06F 15/16* (2006.01)
(52) U.S. Cl. .................................................. 709/227
(58) Field of Classification Search ................ 709/227, 709/228, 237, 246, 248, 249; 707/201
See application file for complete search history.

(56) References Cited

U.S. PATENT DOCUMENTS

| | | | | |
|---|---|---|---|---|
| 5,835,724 A * | 11/1998 | Smith | ........................... | 709/227 |
| 5,913,029 A * | 6/1999 | Shostak | ........................ | 709/203 |
| 6,041,357 A * | 3/2000 | Kunzelman et al. | ........ | 709/228 |
| 6,058,424 A * | 5/2000 | Dixon et al. | ................. | 709/226 |
| 6,076,108 A * | 6/2000 | Courts et al. | ............... | 709/227 |
| 6,098,093 A * | 8/2000 | Bayeh et al. | ............... | 709/203 |
| 6,286,034 B1 * | 9/2001 | Sato et al. | ................... | 709/204 |
| 6,308,212 B1 * | 10/2001 | Besau et al. | ............... | 709/228 |
| 6,338,089 B1 * | 1/2002 | Quinlan | ....................... | 709/227 |
| 6,484,187 B1 * | 11/2002 | Kern et al. | .................. | 707/204 |
| 6,539,494 B1 * | 3/2003 | Abramson et al. | ............. | 714/4 |
| 6,618,394 B1 * | 9/2003 | Hilleary | ..................... | 370/469 |

* cited by examiner

*Primary Examiner*—Andrew Caldwell
*Assistant Examiner*—Stephan Willett
(74) *Attorney, Agent, or Firm*—Lee & Hayes, PLLC

(57) ABSTRACT

A stateless distributed computer architecture allows state-caching objects, which hold server state information, to be maintained on a client or network rather than on a server. In one implementation, the computer architecture implements object-oriented program modules according to a distributed component object model (DCOM). Using an object-oriented network protocol (e.g., remote procedure call), a client-side application calls through an application program interface (API) to a program object residing at a server computer. The program object, responsive to the call, creates a state caching object that contains state information pertaining to the client connection. The server inserts the state-caching object into a local thread context and processes the request to generate a reply. The server subsequently attaches the state-caching object to the reply and returns them both to the client. The client stores the state-caching object for later communication with the server. When the client subsequently calls the program object at the server, the client submits the state-caching object along with the request packet. The server uses the state information in the state-caching object to quickly restore state for the client reconnection. In this manner, the server can offload its state information to other computing devices in the distributed architecture, thereby improving scalability. In another implementation, the network itself caches the server-oriented state-caching object.

10 Claims, 7 Drawing Sheets

INTERNET
ARCHITECTURE

STATELESS DISTRIBUTED COMPUTER ARCHITECTURE WITH SERVER-ORIENTED STATE-CACHING OBJECTS MAINTAINED ON NETWORK OR CLIENT

TECHNICAL FIELD

This invention relates to distributed computer systems and particularly, to stateless distributed computer architectures.

BACKGROUND

Distributed computer systems have multiple computing devices interconnected via one or more networks (or other type of connection) to facilitate a common computing experience. There are many examples of distributed computer systems, including such well-known examples as the client-server architecture, the mainframe-terminal architecture, computer clustering architecture, and so forth.

Software implemented by a distributed computer system is typically distributed throughout the various computing devices, whereby different computers handle different computing tasks. Object oriented programming, for example, can be implemented on a distributed computer system using an extension of the component object model (COM), which is often referred to as "DCOM" (for Distributed COM) or "Network COM".

Object-oriented programming utilizes the concept of "objects" and "object interfaces" to specify interactions between computing units. An object in this context is a unit of functionality that implements one or more interfaces to expose that functionality to outside applications. An interface is a contract between the user, or client, of some object and the object itself. In more practical terms, an object is a collection of related data and functions grouped together for a distinguishable common purpose. The purpose is generally to provide services to remote processes. An interface is a grouping of semantically related functions through which a remote process can access the services of the object. COM has been well documented. For more information regarding COM, the reader is directed to *OLE 2 Programmer's Reference* and *Inside COM*, both published by Microsoft Press of Redmond, Wash.

FIG. 1 shows an exemplary client-server architecture 100 in which a client computer 102 occasionally connects to a file server computer 104 via a network 106, such as a LAN (local area network) or WAN (wide area network). For discussion purposes, suppose the architecture 100 implements object-oriented applications according to the distributed component object model. DCOM specifies how objects at the client 102 and server 104 interact with each other over the network 106. To a client process, the object appears to be readily available, as if it were running on the same computer. In reality, however, the object might be running on a computer that is remotely located and only accessible over the network.

Calling a remote interface (one that is in a different address space than the calling process) requires the use of remote procedure calls (RPCs), which involve "stubs" and "proxies," and topics such as "marshalling" and "unmarshalling" of procedure parameters. These mechanisms are well understood and are documented in the books mentioned above. In regard to these topics, the reader may also want to refer to "X/Open DCE: Remote Procedure Call," published by X/Open Company Ltd., U.K.

In this example, the client-server architecture 100 implements a "state-based" architecture, meaning that the file server 104 maintains state information on behalf of the client. State information pertains to the operations and tasks being performed for or during a particular client-server computing experience. Typically, state information includes one or more identities of participating computers, status of tasks/operations being performed, data being generated, and the like.

In FIG. 1, the client 102 and file server 104 maintain a connection until the entire session is completed. Thus, there may be many communications going back and forth between the client and server during the connection session. In the DCOM context, the communication is in the form of RPCs from the client 102 to remote objects on the server 104. The file server 104 maintains the state information during the connection session.

One problem with the state-based architecture of FIG. 1 is that it does not scale well to accommodate increasingly larger numbers of clients. The file server effectively dedicates resources to a requesting client until that client finishes, thus preventing reallocation of resources to other requesting clients. Additionally, tracking state information on the server for increasingly more clients becomes burdensome on the file server's ability to respond quickly to client requests.

In contrast to state-based architectures, "stateless" architectures do not explicitly keep state information at the file server. FIG. 2 shows an exemplary stateless client-server architecture 200 where a client 202 communicates with a file server 204 over a network 206. The network utilizes a communication protocol that is specially designed to permit the network file server 204 to pass data and state information to the client 202, thereby alleviating the file server 204 from maintaining the state information. A further benefit of "stateless" architectures is that client requests can be sent to any number of identical, replaceable servers, because no single server retains the server state. Instead, the state travels with the client request. One example of a domain-specific stateless communication protocol is the NFS (Network File System) protocol common among UNIX-based network file servers.

Prior art stateless architectures, however, are plagued by the problem that they are limited to domain-specific protocols that prescribe precise protocol-specific state to be exchanged between the client and the server. This makes incremental upgrades of the protocols more difficult because all computers—both clients and servers—must be updated anytime the protocol is modified. Furthermore, it limits the advances that can be made on the server code since the server cannot add new state to the protocol without a pre-existing agreement covering protocol architecture with the client. Accordingly, there remains a need to develop a stateless architecture that is not tied to domain-specific protocols—an architecture in which a server can add arbitrary state to the protocol at anytime without requiring parallel changes to the client.

The Internet's HTTP (hypertext transport protocol) offers one compelling example of a stateless architecture that does not rely on domain-specific state-exchanging protocols. FIG. 3 shows an Internet-based client-server architecture 300 where a client 302 communicates with a Web server 304 via the Internet 306. With HTTP, a browser on the client 302 submits a request to the Web server 304. In response, the Web server 304 processes the request and returns a reply. Originally, there was only one request and one reply per client-server interaction. The Web server had no way of associating consecutive reply/request sets with any one particular client. Thus, if the client subsequently submitted a request, the Web server 304 was incapable of distinguishing whether the request came from the same client or a different client.

To solve this problem, the server began returning data along with the reply that could be used to identify the client. The data piece, commonly referred to as a "cookie", originally included just a user or client ID. Today, cookies can hold essentially any type of date and typically include a name, data, an expiration period, and a scope (e.g., "//msn-.com/bookstore/compsci").

The contents of a cookie originate within a request on the server. The cookie is passed to the client along with the client's request. The client returns the cookie with subsequent requests to the server. To the client, the cookie is an obscure piece of data that resides in memory, perhaps indefinitely (or until deleted as being expired). However, the cookie allows the server to offload storage of state information to the client, who owns a vested interest in preserving relevant state.

As a result, Web servers achieve tremendous scalability to accommodate increasingly more traffic. State-storage capacity, in the form of client-cached cookies, scales linearly with increasing numbers of clients, while access time remains constant. Furthermore, individual servers can be replaced or replicated with greater freedom when no single server hoards state related to a specific client. For more discussion of cookies, the reader is directed to an IETF (Internet Engineering Task Force) specification entitled "HTTP State Management Mechanism", which was published February 1997.

In view of the foregoing discussion, there remains a need for a stateless architecture in a non-HTTP-based distributed computing environment that achieves scalability without utilizing domain-specific protocols.

SUMMARY

A stateless distributed computer architecture allows state-caching objects, which hold server state information, to be maintained on a client or network rather than on a server. In this manner, servers can offload state information to other computing devices in the distributed architecture, thereby improving scalability.

In one implementation, the computer architecture implements distributed object-oriented program modules according to a distributed component object model (DCOM). Using an object-oriented network protocol (e.g., remote procedure call), a client-side application calls through an application program interface (API) to a program object residing at a server computer. The server-based program object, responsive to the call, creates a state-caching object that contains state information pertaining to the client connection. The state-caching object might include, for example, a service ID, a network endpoint ID (e.g., a port ID), an object ID for the program object being called, the status of the current operation, and data.

The server inserts the state-caching object into a local thread context and processes the request to generate a reply. The server subsequently attaches the state-caching object to the reply and returns both to the client. The client stores the state-caching object for later communication with the server. When the client subsequently calls the program object at the server, the client submits the state-caching object along with the request packet. The server uses the state information in the state-caching object to quickly restore state for the client reconnection. At a high-level, the computation can be said to move from the client to the server with a request, back to the client with a reply, and then to the server with another request. The state-caching object moves with the computation.

In many real distributed computer systems, such as large Internet Web sites, computation can easily pass through more than one server in order to be fully processed. For example, a request might pass from a client to a "front-end" server to a "back-end" server, such as a database, and then back through the front-end server to the client. When the front-end server makes a request on the back-end server, it is effectively the back-end server's client. Both the front-end server and the back-end server can create state-caching objects that are entrusted to the client for storage until that client issues a next request on those servers. In large distributed systems, a request might utilize dozens of servers.

In another implementation, the network itself caches the state-caching objects. The network consists of network components, such as routers and other devices. These components are configured so that, within the quality of service (QoS) demands of the distribute system, no messages are ever lost by the network and individual messages are retained within the network until the endpoint devices (computation computers) have completed processing the associated requests. Such an implementation requires that the network have mechanisms for insuring loss-less message transport within the quality-of-service (QoS) demanded by the application and clients.

One example of a network offering loss-less message transport might be a reliable email transport or a peer-to-peer information-sharing system, such as Gnutella. In this implementation, the network components (rather than the client) retain the state-caching objects within messages on the network. In this implementation, computational computers at the periphery of the network do not store state, instead they place all state in state-caching objects that move from computer to computer with the messages of the computation. In another implementation, the computers in a fault-tolerant cluster (rather than the client) retain the state-caching objects. Before completing a request, a given computer insures that the relevant state-caching objects have been replicated to at least one other computer in the cluster. The state-caching objects can be replicated to additional computers as needed to meet the quality of service (QoS) demands of the clients and applications.

DETAILED DESCRIPTION

A stateless distributed computer architecture allows a server to create state-caching objects containing server state information and to pass the state-caching objects to a client or network for remote storage. In this manner, the state information is offloaded from the server to other computing devices in the distributed architecture.

The stateless distributed computer architecture is described in the context of object-oriented applications. Specifically, the computer architecture implements the distributed component object model (DCOM) technologies. It is noted, however, that other distributed object technologies such as Java RMI (Remote Method Invocation), MTS (Microsoft Transaction Server), MSMQ (Microsoft Message Queue), and SOAP (Simple Object Access Protocol) may be used instead of DCOM.

Distributed Computer Architecture

Figure 1:
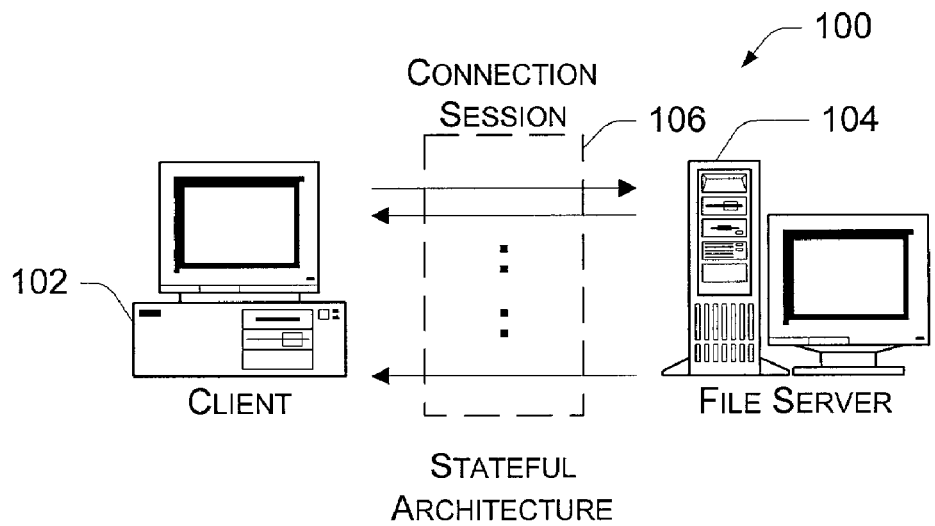
FIG. 1 illustrates a conventional client-server architecture that maintains state information at the server.
Figure 2:
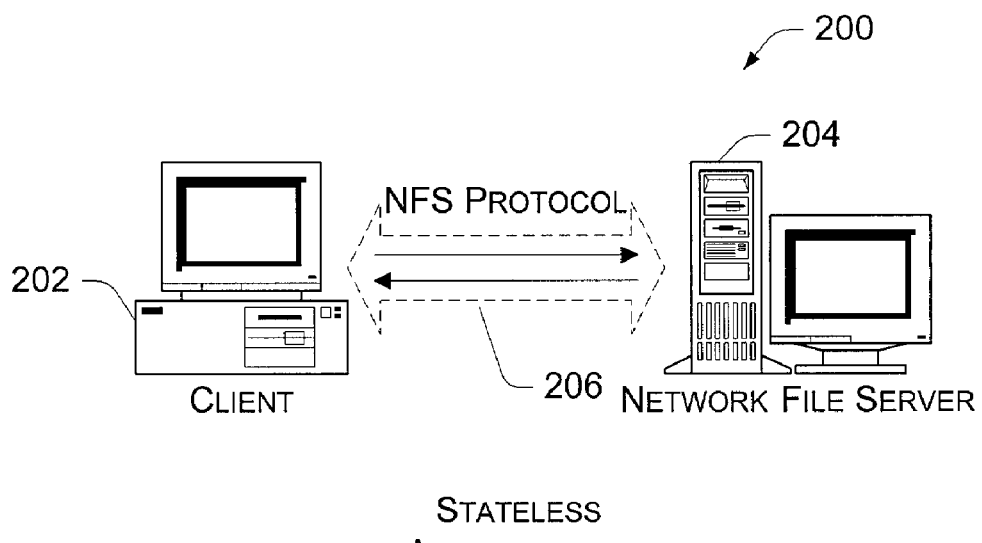
FIG. 2 illustrates a conventional client-server architecture that allows the server to pass state information to the client via domain-specific protocols.
Figure 3:
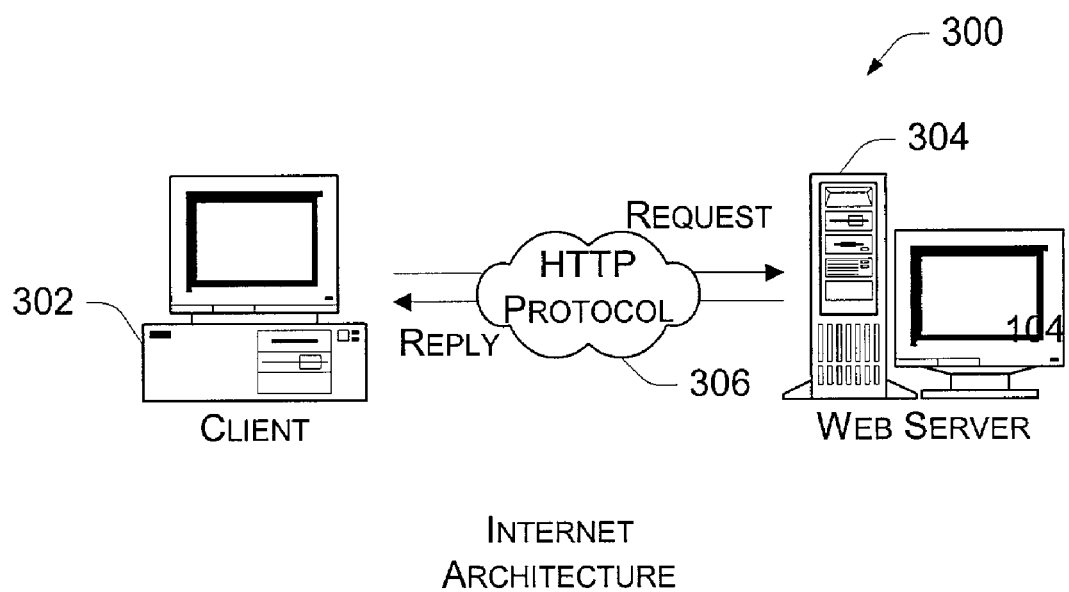
FIG. 3 illustrates a conventional Internet-based client-server architecture that implements HTTP.
Figure 4:
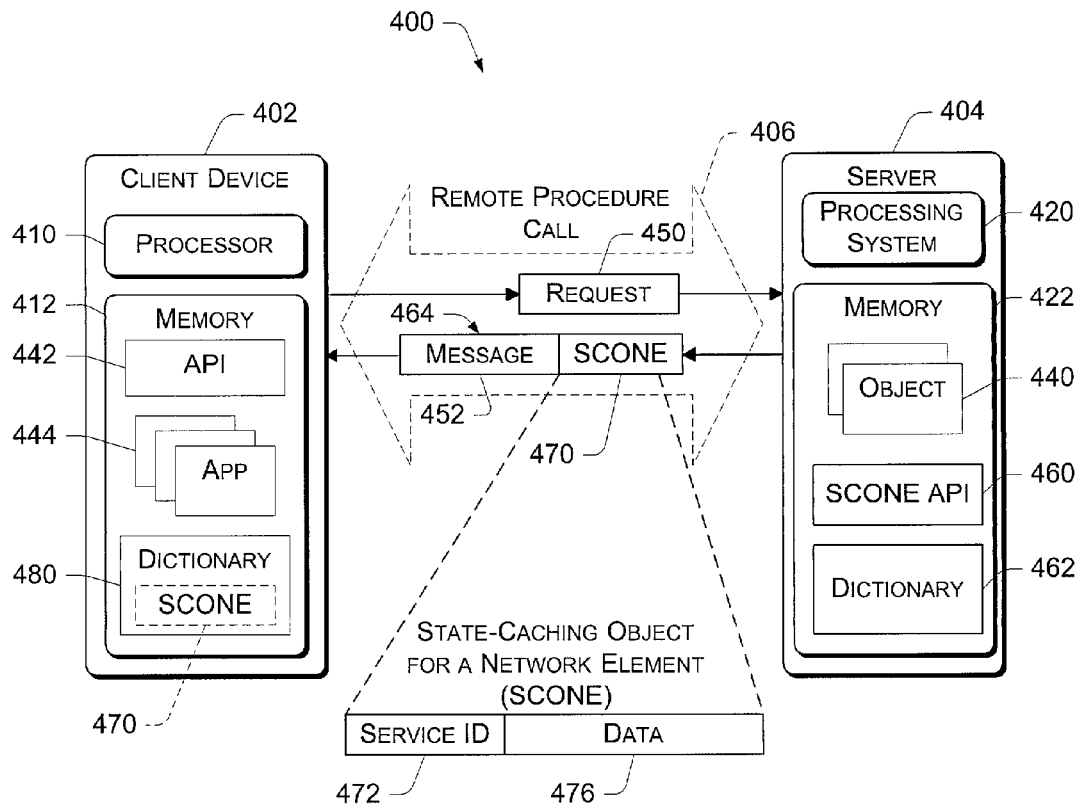
FIG. 4 is a block diagram of a distributed computer system that is architected according to a distributed component object model and that utilizes an object-oriented network protocol to exchange messages.

FIG. 4 shows an exemplary distributed computer system 400 having a client 402 and a server 404 interconnected via a network 406. The client 402 has a processor 410 and a memory 412 (e.g., ROM, RAM, Flash, hard disk, etc.), and may be embodied as any of many different types of computing devices, including a personal computer, portable computer, handheld computer, wireless communication device, set top box, game console, and so forth.

Similarly, the server 404 has a processing system 420 and a memory 422 (e.g., ROM, RAM, Flash, hard disk, disk arrays, etc.). The server 404 may be embodied as any of many different types of computing devices, including a minicomputer, a personal computer configured with server software, the like. Moreover, although only one computer is illustrated, the server 406 may represent a cluster of computers that together perform the server tasks.

In the described implementation, the distributed computing system 400 is architected according to the distributed component object model (DCOM). DCOM extends COM to define how objects interact with each other over a network, such as network 406. The network 406 may be implemented in many different ways (e.g., local area network, wide area network, storage area network, Internet, etc.) using many different technologies, including wire-based technologies (e.g., cable, network wire, etc.) and wireless technologies (e.g., satellite, RF, microwave, etc.). COM and DCOM are well known to the skilled artisan.

Program objects are distributed at both the client 402 and the server 404 and interact over the network 406. In FIG. 4, one or more server-side program objects 440 reside on the server 404. The program objects 440 are stored in memory 422 and executed on the processing system 420. A client-side application program interface (API) 442 resides on the client device 402 (stored in memory 412 and executed on processor 410). The server-side objects 440 and client-side API 442 may be constructed as part of computer operating systems that reside on the respective client and server computing devices.

One or more applications 444 running on the client 402 use the API 442 to call to the server-side objects 440. The network 406 supports a protocol that allows applications to call objects running on remote computers that are only accessible over the network. To the client process, the server-side object 440 may appear to be readily available, as if it were running on the same computer, even though it is running remotely on the server.

One suitable object-oriented network protocol is the remote procedure call (RPC) protocol. Using RPC, an application 444 on the client 402 calls the API 442 to pass a request 450 over the network 406 to the server-side object 440. The server-side object 440 processes the request and returns a reply message 452 over the network 406.

With conventional DCOM, the server maintains the state information regarding the client interaction. As noted in the Background, maintaining state information at the server hampers scalability and performance as the number of clients increases.

Accordingly, unlike the tradition DCOM architecture, system 400 is further configured to permit the server 404 to offload the state information to the client 402. The state information is kept in an object that is referred to as a "state-caching object for a network element" or "SCONE". When the server receives a client request, the server-side program object calls a local API 460 to create a server-oriented SCONE. A dictionary 462 may be used to temporarily store portions of the state information as it is removed from the client request, such as client ID, connect time, and so forth.

The server-side object 440 returns a reply packet 464 that contains both the message 452 and the SCONE 470. At a minimum, the SCONE 470 includes a service ID field 472 to hold an identity of the server object, and a data field 476 pertaining to state information. The client 402 receives the packet 464 and detaches the SCONE 470 from the message 452. The client then stores the SCONE 470 in a client-side dictionary 480 and processes the message 452 to satisfy the function call. If the client 402 subsequently calls the server 404, the client retrieves the SCONE 470 from dictionary 480 by service ID and attaches the SCONE to the request destined for the server 404. The server recovers the SCONE 470 from the new client request and uses the state information to restore session state to handle the request.

Figure 5:
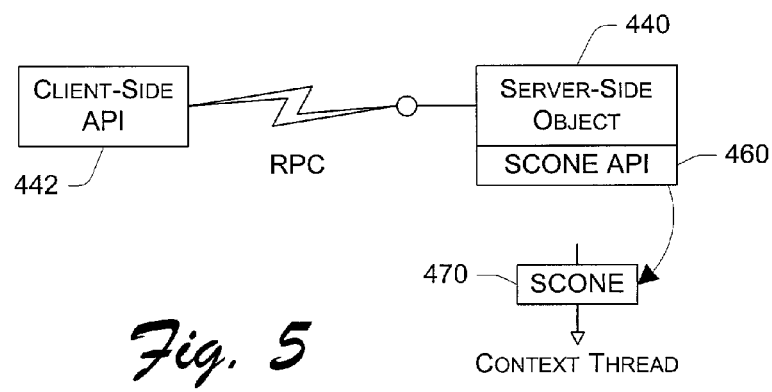
FIG. 5 is a block diagram of the distributed software architecture supported by the distributed computer system of FIG. 4.

FIG. 5 shows an exemplary program view of the object-oriented applications implemented in distributed computer system 400. Through the client-side API 442 via RPC, a client process can obtain a pointer to the server-side object 440 on the client device 404. When such an interface pointer has been obtained, it is said that the client process has obtained an interface on the object, allowing the client process to bind to the object.

Through SCONE API 460, the server creates and inserts an SCONE 470 into a thread context. On reply, the SCONE 470 is removed from the thread context and attached to the message. The reply packet is carried to the client over the network. In one implementation, a DCOM interface "IChannelHook" is used to transport the requests and replies, together with the SCONE, between the client and server. IChannelHook is a known mechanism used by services such as Microsoft Transaction Server to pass transaction contexts between clients and servers.

State-Caching Process

Figure 6:
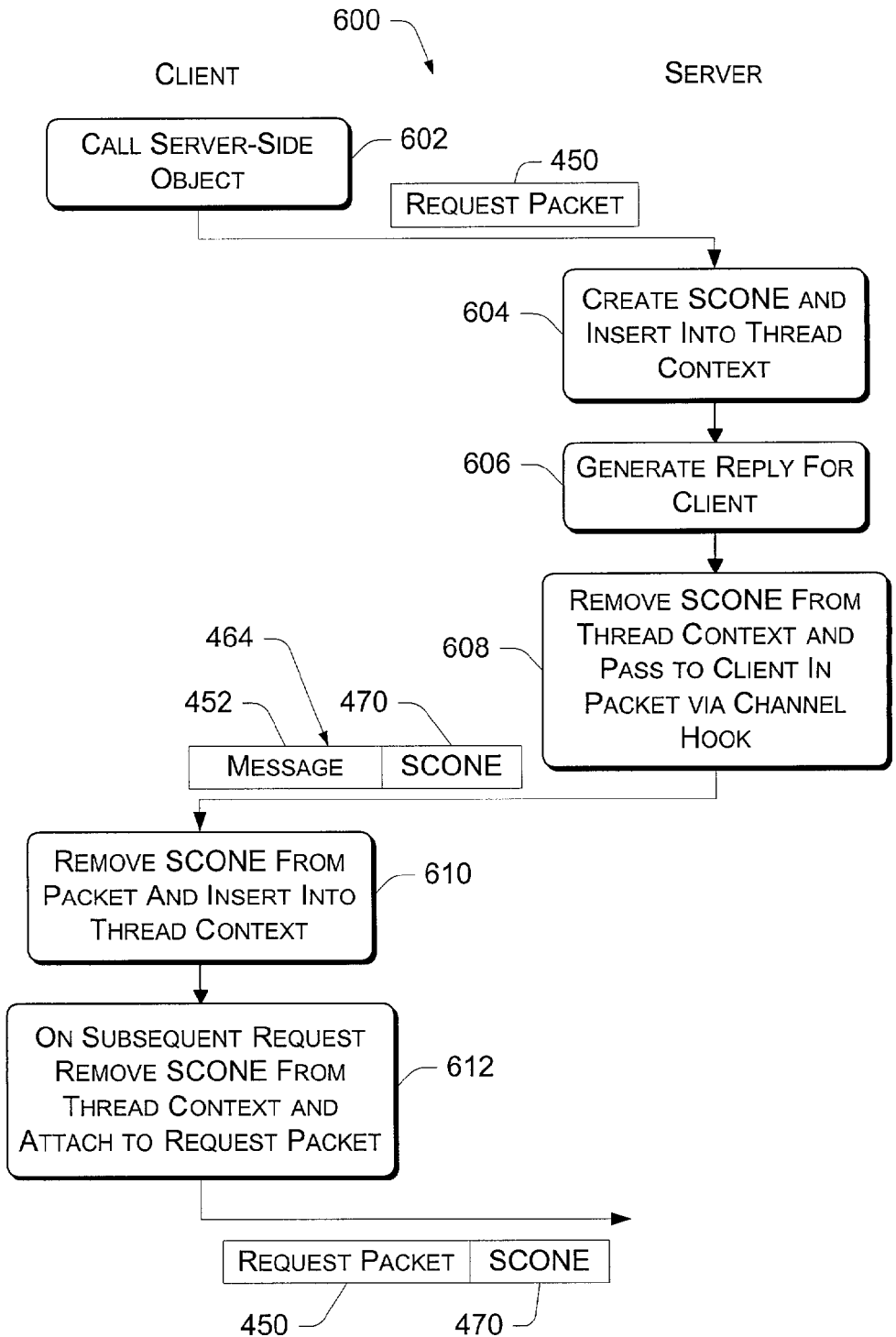
FIG. 6 is a flow diagram of a server state-caching process in which server state information is offloaded to a remote client computer.

FIG. 6 shows a state-caching process 600 in which the server offloads state information to the client. The process 600 is implemented by the distributed computer system 400 and is described with references to FIGS. 4 and 5. The process may be implemented in software or firmware as computer-executable instructions that, when executed, perform the operations illustrated in the blocks.

At block 602, a client application 444 uses the client-side API 442 to call a server-side object. As part of the call, a request packet 450 is passed to the server 404. At block 604, the server creates a SCONE 470 and through API 460, inserts the SCONE 470 into the thread context. The server then generates a reply to the client request (block 606).

At block 608, on reply, the SCONE 470 is removed from the thread context and attached to the reply message 452, thereby forming a reply packet 464. As noted above, the server may use, for example, the IChannelHook mechanism to return the reply packet 464 and transparently transport the SCONE 470.

At block 610, the client removes the SCONE 470 from the reply packet 464 and inserts it into the client thread context. The SCONE 470 may alternatively or additionally be stored in the dictionary 480. When the client sends a subsequent request to the server, the client attaches the SCONE 470 to the request packet 450 (block 612). The server removes the SCONE 470 from the request packet and inserts it into the server thread context to restore state. The server may additionally store the SCONE 470 in the server-side dictionary 462 and/or modify the SCONE 470 in the event that any server state information has changed.

Exemplary Computing Device

Figure 7:
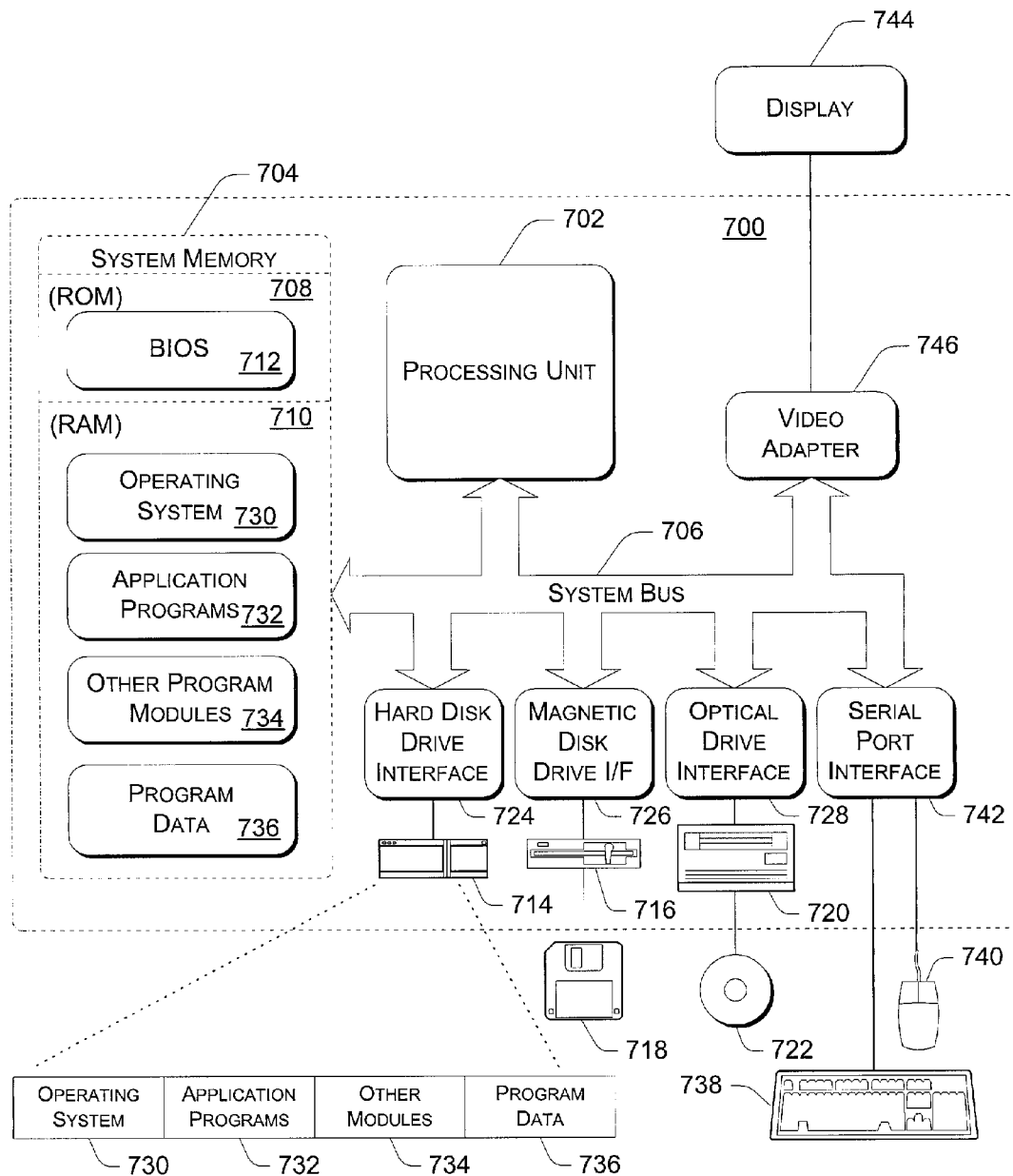
FIG. 7 is a block diagram of a computer that may be used to implemented devices in the distributed computer system.

FIG. 7 illustrates an example of an independent computing device 700 that can be used to implement the client or server in system 400 of FIG. 4. The computing device 700 may be implemented in many different ways, including a general-purpose computer (e.g., workstation, server, desktop computer, laptop computer, etc.), a handheld computing device (e.g., PDA, PIM, etc.), a portable communication device (e.g., cellular phone with computing capabilities), or other types of specialized appliances (e.g., set-top box, game console, etc.).

In the illustrated example, computing device 700 includes one or more processors or processing units 702, a system memory 704, and a bus 706 that couples the various system components including the system memory 704 to processors 702. The bus 706 represents one or more types of bus structures, including a memory bus or memory controller, a peripheral bus, an accelerated graphics port, and a processor or local bus using any of a variety of bus architectures. The system memory 704 includes read only memory (ROM) 708 and random access memory (RAM) 710. A basic input/output system (BIOS) 712, containing the basic routines that help to transfer information between elements within the computing device 700 is stored in ROM 708.

Computing device 700 further includes a hard drive 714 for reading from and writing to one or more hard disks (not shown). Some computing devices can include a magnetic disk drive 716 for reading from and writing to a removable magnetic disk 718, and an optical disk drive 720 for reading from or writing to a removable optical disk 722 such as a CD ROM or other optical media. The hard drive 714, magnetic disk drive 716, and optical disk drive 720 are connected to the bus 706 by a hard disk drive interface 724, a magnetic disk drive interface 726, and a optical drive interface 728, respectively. Alternatively, the hard drive 714, magnetic disk drive 716, and optical disk drive 720 can be connected to the bus 706 by a SCSI interface (not shown). It should be appreciated that other types of computer-readable media, such as magnetic cassettes, flash memory cards, digital video disks, random access memories (RAMs), read only memories (ROMs), and the like, may also or alternatively be used in the exemplary operating environment.

A number of program modules may be stored on ROM 708, RAM 710, the hard disk 714, magnetic disk 718, or optical disk 722, including an operating system 730, one or more application programs 732, other program modules 734, and program data 736. As one example, the APIs and objects may be implemented as one or more programs 732 or program modules 734 that are stored in memory and executed by processing unit 702. The drives and their associated computer-readable media provide nonvolatile storage of computer-readable instructions, data structures, program modules and other data for computing device 700.

In some computing devices 700, a user might enter commands and information through input devices such as a keyboard 738 and a pointing device 740. Other input devices (not shown) may include a microphone, joystick, game pad, satellite dish, scanner, or the like. In some instances, however, a computing device might not have these types of input devices. These and other input devices are connected to the processing unit 702 through an interface 742 (e.g., USB port) that is coupled to the bus 706. In some computing devices 700, a display 744 (e.g., monitor, LCD) might also be connected to the bus 706 via an interface, such as a video adapter 746. Some devices, however, do not have these types of display devices. Computing devices 700 might further include other peripheral output devices (not shown) such as speakers and printers.

Generally, the data processors of computing device 700 are programmed by means of instructions stored at different times in the various computer-readable storage media of the computer. Programs and operating systems are typically distributed, for example, on floppy disks or CD-ROMs. From there, they are installed or loaded into the secondary memory of a computing device 700. At execution, they are loaded at least partially into the computing device's primary electronic memory. The computing devices described herein include these and other various types of computer-readable storage media when such media contain instructions or programs for implementing the operations described below in conjunction with a microprocessor or other data processor. The system also includes the computing device itself when programmed according to the methods and techniques described below.

For purposes of illustration, programs and other executable program components such as the operating system are illustrated herein as discrete blocks, although it is recognized that such programs and components reside at various times in different storage components of the computing device 700, and are executed by the data processor(s) of the computer.

It is noted that the computer 700 may be connected to a network via a wire-based or wireless connection to interact with one or more remote computers. In this network context, the computer 700 may be configured to store and execute certain tasks, while one or more remote computers store and execute other tasks. As a result, the architecture is distributed, with various components being stored on different computer-readable media.

Network Storage of State-Caching Objects

Thus far, the stateless distributed computer architecture has been described in the client-server environment, where state information traditionally kept at the server is cached at the client. However, the distributed computer architecture may be implemented such that the state information is neither kept at the server nor the client (nor any other endpoint devices on a network). Rather, the network itself caches the state-caching objects. Such an implementation requires that the network have mechanisms for insuring loss-less message transport within the quality-of-service (QoS) demanded by the application and clients.

Figure 8:
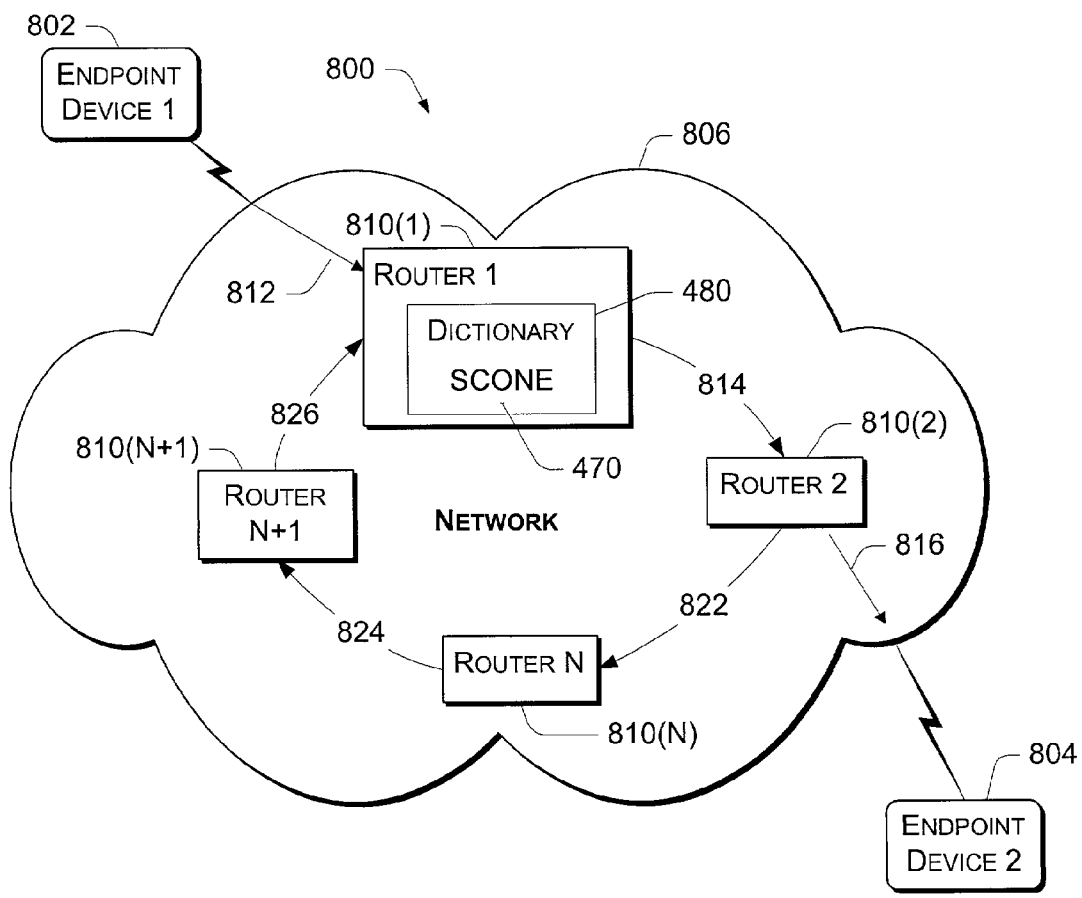
FIG. 8 is a block diagram of a network system and illustrates network components within the network that may be used to maintain state-caching information for endpoint computing devices.

FIG. 8 shows a network system 800 having a first endpoint device 802 and a second endpoint device 804 interconnected via a network 806. The network 806 consists of one or more specially configured computing devices whose task is to route messages between the endpoint computing devices 802 and 804. The network computing devices may include routers, hubs, relays, repeaters, satellite uplinks and downlinks, RF transceivers, and the like.

For discussion purposes, the network 806 is illustrated as having multiple routers 810, including routers 1, 2, . . . , N, N+1, . . . , etc. The routers are computers with memory and processing capabilities that are specially tailored to route messages efficiently and rapidly through a network. In this example, a message from the first endpoint 802 to the second endpoint 804 may be routed through routers 810(1) and 810(2) along path segments 812, 814, and 816. Many other routes may be achieved depending upon the bandwidth and router availability at any given time in the network.

Suppose the second endpoint 804 (e.g., a server) responds to the request by returning a reply packet that contains a SCONE 470. The reply packet may be routed back to the first endpoint 802 via the same or different path through the network 806.

Rather than caching the SCONE 470 on the first endpoint 802, however, the network 806 keeps the SCONE 470 on behalf of the two endpoint devices 802 and 804. According to one implementation, a network component copies the SCONE 470 from the reply packet and stores it. This is represented in FIG. 8 by the SCONE 470 being stored in router 810(1) in a dictionary 480 by service ID. If the first endpoint device 802 subsequently sends another request to the second endpoint device 804, the router 810(1) notes the reuse of the service ID and reattaches the SCONE 470 to the packet to return the state information to the second endpoint device 804. If no subsequent request is made, the SCONE 470 remains on the router 810(1) until it expires and is removed from memory.

According to a second implementation, the SCONE 470 is not kept at one router, but instead is continuously routed among various network components indefinitely or until timeout. In this example, the SCONE 470 may be circulated among four routers 810(1), 810(2), 810(N), and 810(N+1), as represented by path segments 814, 822, 824, and 826. If a subsequent connection between the first and second endpoint devices is made, first router 810(1) to transport the message issues a distributed query to the other routers 810(2), 810(N), and 810(N+1) to locate the matching SCONE 470 if any. The SCONE 470 is subsequently reassociated with a request and returned to the second endpoint 804 to restore state information.

The network system 800 offers two primary advantages. First, none of the endpoint devices 802 and 804 is required to keep state information that pertains to interactions between the two devices. Second, the state information is preserved even if both endpoint devices 802 and 804 fail.

SCONE-Based Fault Tolerant Computer Cluster

The stateless distributed computer architecture may also be configured as a fault tolerant computer cluster. The computers within the cluster (rather than the client) retain the state-caching objects. Before completing a request, a given computer insures that the relevant state-caching objects have been replicated to at least one other computer in the cluster. The state-caching objects can be replicated to additional computers as necessary to meet the quality of service (QoS) demands of the clients and applications.

Figure 9:
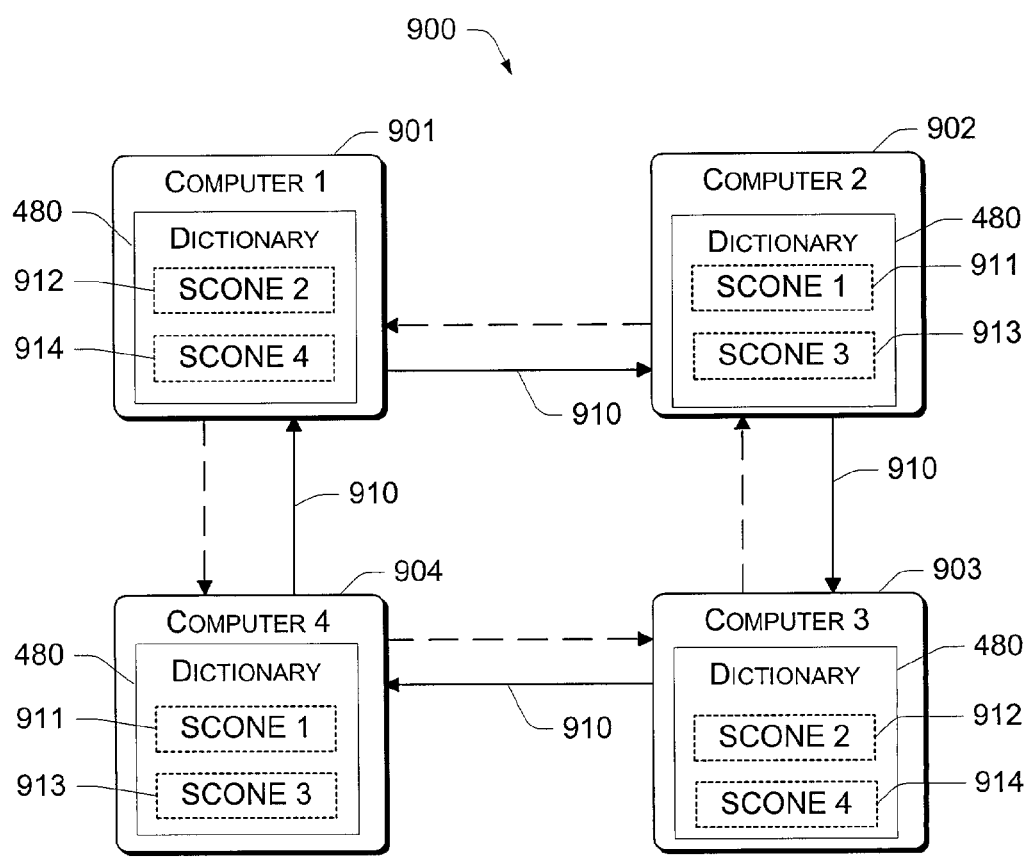
FIG. 9 is a block diagram of a computer cluster and illustrates sharing state-caching information among the various computers.

FIG. 9 shows an exemplary computer cluster 900 with four computers 901, 902, 903, and 904. The computer cluster 900 may be configured to provide many diverse services, such as database services, Web hosting services, file management services, email services, and the like. Although not illustrated, each computer has processing and memory capabilities and may be implemented, for example, as the computer shown in FIG. 7.

The computers communicate with one another using an object-oriented network protocol, such as RPC, to facilitate request/reply exchanges 910 (which are pictorially represented by the solid and dashed lines between computers). The request/reply exchanges 910 are performed occasionally or routinely for the purposes of creating state-caching objects that hold state information for each computer. The request/reply exchanges 910 may be performed, for example, in the same manner described above with respect to FIGS. 4–6.

To demonstrate the request/reply exchange for cluster 900, suppose the second computer 902 initiates a request to the first computer 901. In response, the first computer 901 creates and returns a SCONE 911, which is stored at the second computer 902. As part of the act of returning the reply (and SCONE 911) to the second computer 902, the first computer 901 also transmits a copy of the SCONE 911 to a fourth computer 904. The SCONE 911 contains state information for the first computer 901.

The remaining computers perform similar request/reply exchanges 910 so that each computers state is stored on at least two other computers. That is, computer 2 stores SCONE 911 for computer 1 and SCONE 913 for computer 3, computer 3 stores SCONE 912 for computer 2 and SCONE 914 for computer 4, computer 4 stores SCONE 911 for computer 1 and SCONE 913 for computer 3, and computer 1 stores SCONE 912 for computer 2 and SCONE 914 for computer 4.

If any one computer fails, the remaining computers should be able to use the state-caching objects associated with the failed computer to restore state information following the failure. In this manner, the cluster 900 utilizes the remotely stored state-caching objects as a mechanism for providing some fault tolerance.

CONCLUSION

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A stateless distributed computer system, comprising:
a network having one or more network components to route requests from a first endpoint device to a second endpoint device and to route replies from the second endpoint device back to the first endpoint device, wherein at least one reply contains state information pertaining to the second endpoint device; and
the network being configured to maintain the state information and to reassociate the state information with a subsequent request from the first endpoint device to the second endpoint device, and wherein multiple network components continually route the state information amongst themselves to preserve the state information.

2. A stateless distributed computer system as recited in claim 1, wherein state information is embodied as a data object.

3. Computer-readable media in a network system comprising computer-executable instructions that, when executed on one or more processors, direct the system to:
 route, via one or more network components, a request from a first endpoint device to a second endpoint device;
 route, via the one or more network components, replies from the second endpoint device back to the first endpoint device, wherein at least one reply contains state information pertaining to the second endpoint device;
 continually route the state information among multiple network components to preserve the state information; and
 reassociate the state information with a subsequent request being routed from the first endpoint device to the second endpoint device.

4. A system, comprising:
 network means for routing requests from a client to a server and for routing a reply from the server back to the client, wherein the reply contains state a information pertaining to the server; and
 the network means comprising means for maintaining the state information within the network means and for reassociating the state information with a subsequent request from the client to the server, and means for continually routing the state information among network components to preserve the state information.

5. A system as recited in claim 4, wherein state information is embodied as a data object.

6. A method comprising:
 routing, via a network, a request from a first endpoint device to a second endpoint device;
 routing, via the network, a reply from the second endpoint device back to the first endpoint device, wherein the reply contains state information pertaining to the second endpoint device;
 maintaining the state information at the network by continually routing the state information along network components of the network to preserve the state information; and
 reassociating the state information with a subsequent request being routed from the first endpoint device to the second endpoint device.

7. A method as recited in claim 6, wherein the state information is embodied as a data object.

8. A method comprising:
 routing a request from a client to a server over a network;
 routing a reply from the server back to the client over the network, wherein the reply contains state information pertaining to the server; and
 maintaining the state information on the network while awaiting a subsequent request from the client to the server by continually routing the state information among network components of the network to preserve the state information.

9. A method as recited in claim 8, wherein the state information is embodied as a data object.

10. A method as recited in claim 8, further comprising reassociating the state information with a subsequent request being routed from the client to the server.

* * * * *